United States Patent
Otohata et al.

(10) Patent No.: US 7,498,099 B2
(45) Date of Patent: Mar. 3, 2009

(54) FILM COVERED BATTERY

(75) Inventors: Makihiro Otohata, Kawasaki (JP); Hiroshi Yageta, Kawasaki (JP)

(73) Assignee: NEC Corporation, Tokyo (JP)

( * ) Notice: Subject to any disclaimer, the term of this patent is extended or adjusted under 35 U.S.C. 154(b) by 738 days.

(21) Appl. No.: 10/786,310

(22) Filed: Feb. 26, 2004

(65) Prior Publication Data

US 2004/0175611 A1    Sep. 9, 2004

(30) Foreign Application Priority Data

Mar. 3, 2003    (JP)    ............... 2003-055572

(51) Int. Cl.
  H01M 6/12    (2006.01)
  H01M 6/46    (2006.01)
  H01M 2/00    (2006.01)
  H01M 2/02    (2006.01)

(52) U.S. Cl. ............... 429/178; 429/162; 429/163

(58) Field of Classification Search ............... 429/178, 429/162, 163
See application file for complete search history.

(56) References Cited

U.S. PATENT DOCUMENTS 5,326,652 A * 7/1994 Lake ............... 429/127

6,106,973 A * 8/2000 Sonozaki et al. ............... 429/162
2004/0009403 A1    1/2004 Kim et al.

FOREIGN PATENT DOCUMENTS

| | | |
|---|---|---|
| EP | 0 997 959 A1 | 5/2000 |
| JP | 2000-58010 A | 2/2000 |
| JP | 2000-138040 A | 5/2000 |
| JP | 2001-126678 A | 5/2001 |
| JP | 2001-202931 A | 7/2001 |
| JP | 2001-297736 A | 10/2001 |
| JP | 2001-325992 A | 11/2001 |
| JP | 2002-231196 A | 8/2002 |
| JP | 2002-298825 A | 10/2002 |
| JP | 2002-343439 | 11/2002 |
| KR | 20-0289707 | 9/2002 |
| WO | 01/28007 A1 | 4/2001 |

* cited by examiner

*Primary Examiner*—Patrick Ryan
*Assistant Examiner*—Julian Mercado
(74) *Attorney, Agent, or Firm*—Sughrue Mion, PLLC

(57) ABSTRACT

A film covered battery has a battery element, a casing for sealing the battery element, and lead terminals connected to a positive electrode and a negative electrode, respectively, of the battery element, and extending from the casing. The casing is flexible, and is comprised of two halves for sealably sandwiching the battery element on both sides in the thickness direction thereof. One of the halves of the casing, sandwiching the battery element, is formed with a recess for receiving the battery element. The lead terminals are each connected to the battery element at a position inside of both surfaces of the battery element in the thickness direction.

9 Claims, 5 Drawing Sheets

FILM COVERED BATTERY

BACKGROUND OF THE INVENTION

1. Field of the Invention

The present invention relates to a film covered battery which contains a battery element sealed by a casing made of a film.

2. Description of the Related Art

In recent years, batteries for use by portable devices as power sources are strictly required to be increasingly lighter in weight and smaller in thickness. Such tendency also affects a battery casing so that a conventional metal can, which is limited in a reduction in weight and thickness, has been gradually replaced by a metal foil film or by a laminate film made of a metal foil and a heat-sealable resin film laminated thereon, which is used as a casing because it can be further reduced in weight and thickness and can be made in a free shape, as opposed to the metal pack.

A representative example of laminate film suitably used for a battery casing may be a three-layer laminate film which is comprised of an aluminum foil, which is a metal thin film, a heat-sealable resin film laminated on one side of the aluminum foil to function as a heat seal film, and a protective film laminated on the other side of the aluminum foil.

Generally, in a film covered battery which employs a casing made of a laminate film, a battery element including a positive electrode, a negative electrode, an electrolyte, and the like are covered with the casing with the heat-sealable resin film being located inside, and the casing is thermally fused around the battery element to seal the battery element. The heat-sealable resin film is made, for example, by a polyethylene film or a polypropylene film, while the protection film is made, for example, of a nylon film or a polyethylene terephthalate film.

Lead terminals are connected to the positive electrode and negative electrode, respectively, for leading out the electrodes to the outside of the casing, and the lead terminals are extended from the casing. The lead terminals are connected to the battery element by ultrasonic welding or the like prior to the sealing of the battery element. Generally, the battery element is sealed using two casing materials by sandwiching the battery element between the two casing materials, and thermally fusing the casing materials around the overall peripheries thereof. In this event, three sides of the casing materials may be first thermally fused into a bag-like shape, followed by thermal fusing of the remaining sides of the respective casing materials in a vacuum atmosphere, permitting the casing materials to come into close contact with the battery element.

When the battery element has a certain degree of thickness, one casing material may be previously formed in a collared cup shape such that the battery element can be readily received thereby. Then, the cup-shaped casing material is put over the battery element to cover it. This has been generally done in practice.

JP-2001-126678-A discloses a laminate polymer electrolyte battery which has a battery element comprised of multiple positive electrodes and negative electrodes. Each of the electrodes has a protruding tab coated with an electrode material. The positive and negative electrodes are laminated together with separators interposed between each positive electrode and each negative electrode. The separators are impregnated with an electrolyte solution. The tabs of the positive electrodes and the tabs of negative electrodes are collectively ultrasonic welded, respectively, to form charge collectors for the positive electrode and negative electrode, respectively, in the battery element. The charge collectors are connected to lead terminals of the positive electrode and negative electrode, respectively. Then, the battery element having the lead terminals connected thereto is placed on a flat enclosure material, the other cup-shaped enclosure material is placed over the flat enclosure material with the battery element included therein, and the two enclosure materials are thermally fused along their peripheries to create the laminate polymer electrolyte battery. In the laminate polymer electrolyte battery thus fabricated, the charge collectors are formed by applying pressure to the tabs of the positive and negative electrodes from above using an ultrasonic welding head, and the battery element is sealed using the two enclosure materials as mentioned above. With the use of the two enclosure materials in the shapes mentioned above, the lead terminals are led out near the bottom of the battery element.

A battery having a battery element comprised of alternately laminated positive electrodes and negative electrodes is referred to as a "laminate battery." There is another type of battery referred to as a "wound-type battery." This type of battery has a battery element comprised of alternately laminated positive electrodes and negative electrodes. A strip-shaped positive electrode and negative electrode are laid one on the other with an intervening separator sheet therebetween, wound around, and compressed into a flat shape to form the alternately laminated positive electrodes and negative electrodes.

The battery elements also include one having a charge accumulating function such as a capacitor, other than chemical batteries such as a lithium battery, a nickel hydrogen battery, and the like. By now, the capacitor is also fabricated using a casing made of a laminate film.

Further, the laminate film has been used for casings for use with batteries directed to large equipment such as a hybrid car, which are required to provide high power and large capacity, because a battery covered with a casing made of the laminate film can have increased electrode areas in spite of its thin and light-weight feature, as compared with batteries using a metal can.

The conventional laminate polymer electrolyte battery mentioned above, however, has a problem in that the lead terminals can extend obliquely from the enclosure materials. This phenomenon will be described below with reference to FIGS. 1 and 2.

As illustrated in FIG. 1, enclosure material 102a, which coveres battery element 105, is formed into a cup shape through a deep drawing process. For this reason, a recess formed in enclosure material 102a for receiving battery material 105 has a diverging side surface, causing the formation of a space between battery element 105 and enclosure material 102a. Also, particularly in the laminate polymer electrolyte battery, charge collector 109 is formed for collectively connecting a plurality of positive electrodes and a plurality of negative electrodes to associated lead terminals 103, respectively. Charge collector 109, however, protrudes from part of battery element 109, and has a smaller thickness than battery element 105, so that it is a general tendency from a viewpoint of facilitating the deep draw process of enclosure material 102a that the recess of enclosure material 102a is formed in a shape which is designed out of consideration of charge collector 109, and generally in a substantially rectangular shape including a portion in which charge collector 109 is located.

As a result, before battery material 105 is sealed as illustrated in FIG. 1, a large space is formed between enclosure material 102a and battery element 105 particularly in a region in which charge collector 109 is formed. As described above, battery element 105 is carried on flat enclosure material 102b, and the space is formed due to the recess of enclosure material 102a which covers battery element 105.

If battery material 109 is sealed in the state illustrated in FIG. 1, charge collector 109 and lead terminal 103 are pulled up, causing enclosure materials 102a, 102b to cave in and deform into unintended shapes, as well as charge collector 109 and lead terminal 103 to bow. Bowed charge collector 109 and lead terminal 103 will result in lead terminal 103 extending obliquely with respect to the thickness direction of battery element 105. Disadvantageously, obliquely extending lead terminal 103 would be an impediment when the laminate film electrolyte battery is mounted on an associated device.

Lead terminal 103 bows larger as battery element 105 has a larger thickness, and particularly, the thickness of battery element 105 exceeding 3 mm makes lead terminal 103 more susceptible to bowing.

SUMMARY OF THE INVENTION

It is an object of the present invention to provide a film covered battery using a casing formed with a recess for receiving a battery element, wherein lead terminals are prevented from bowing in an unintended direction due to the casing which caves in when the battery element is sealed.

To achieve the above object, a film covered battery according to the present invention has a battery element having a positive electrode and a negative electrode opposing each other, a flexible casing comprised of two halves for sandwiching the battery element from both sides in a thickness direction of the battery element to seal the battery element, and lead terminals connected to the positive electrode and the negative electrode of the battery element, respectively, and extending from the casing. One half of the casing is provided with a recess for receiving the battery element on one side thereof across the battery element. The lead terminals are each connected to the battery element at a position inside of both surfaces of the battery element in the thickness direction thereof.

In the film covered battery of the present invention configured as described above, since the lead terminals are each connected to the battery element at a position between both surfaces of the battery element in the thickness direction thereof, a space is formed between the battery element and the casing on both sides of a connection of the battery element with each lead terminal in the thickness direction of the battery element before the battery element is sealed. Therefore, when a region surrounded by the casing is evacuated to seal the battery element so that the casing receives the atmospheric pressure from the outside, the connection of the battery element with each lead terminal receives forces from both sides of the battery element in the thickness direction thereof. Consequently, the connection of the battery element with the lead terminal is prevented from deforming, and as a result, the extending portion of the lead terminal is prevented from bowing.

The present invention can be suitably applied to a film covered battery which includes a laminate battery element that has a plurality of positive electrodes and a plurality of negative electrodes which are alternately laminated, and charge collectors corresponding respectively to the positive electrode and the negative electrode which are each formed by collectively joining tabs included in the respective positive electrodes and negative electrodes. In this structure, each of the charge collectors is positioned inside of both surfaces of the battery element in the thickness direction thereof, and the lead terminals are connected to the charge collectors, respectively. When the battery element has a thickness of 3 mm or more, each of the charge collectors is preferably positioned 1 mm or more inside of both surfaces of the battery element in the thickness direction thereof.

Also, the recess formed in the casing preferably has a depth which is substantially equal to the height from the surface of a portion of the lead terminal extending from the casing to the surface of the battery element received in the recess. Since the depth of the recess thus determined can minimize the volume of a space formed between the recess and the battery element, the casing is prevented from unintended deformation in the one half having the recess formed when the battery element is sealed.

Further, in the present invention, each of the lead terminals may be bent in a crank shape in a direction opposite to the one half of the casing formed with the recess in order to facilitate the connection of the lead terminals when the film covered battery is mounted in another device. In this event, a leading end of each bent lead terminal is preferably positioned outside of a surface on the opposite side of the recess in the thickness direction of the battery element. This positioning prevents the lead terminal in the extending portion from bowing, caused by the casing which lifts up the battery element when the battery element is sealed. Also, particularly, when the battery element includes the charge collectors, and the lead terminal is bent in a crank shape, the other half of the casing, located on the opposite side of the one half formed with the recess across the battery element, may be formed with a protrusion substantially equal to the height from the surface of the other half of the casing on the opposite side of the recess having half of the casing to the charge collector in a region opposing the charge collector, in which case the position of the leading end of each lead terminal can be substantially equal in level to the position of the surface of the half of the casing on the opposite side of the recess having half of the casing.

The above and other objects, features and advantages of the present invention will become apparent from the following description with reference to the accompanying drawings which illustrate embodiments of the present invention.

DESCRIPTION OF THE PREFERRED EMBODIMENTS

First Embodiment

Figure 1:
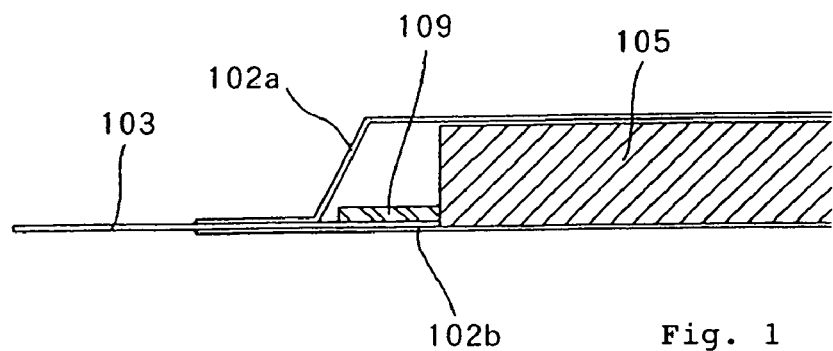
FIG. 1 is a cross-sectional view of a conventional laminate film electrolyte battery near a charge collector before a battery element is sealed, for describing a problem of the conventional laminate film electrolyte battery.
Figure 2:
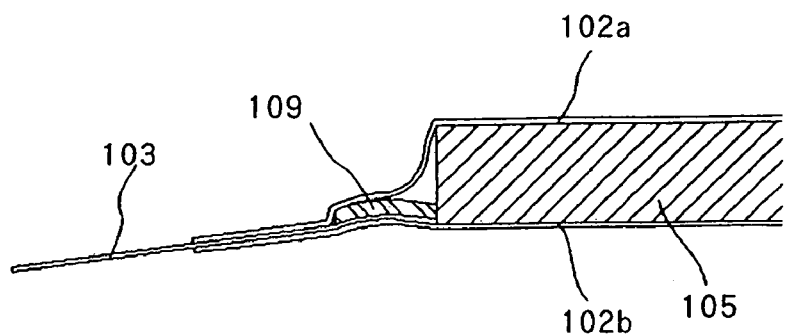
FIG. 2 is a cross-sectional view of the conventional laminate film electrolyte battery near the charge collector after the battery element has been sealed, for describing the problem of the conventional laminate film electrolyte battery.
Figure 3:
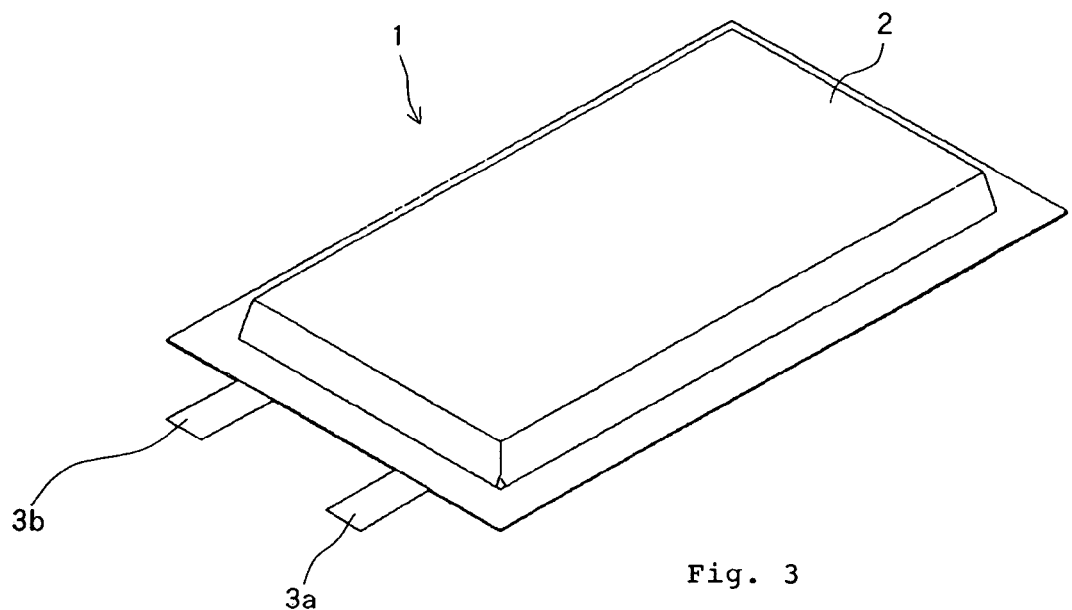
FIG. 3 is a perspective view of a film covered battery according to a first embodiment of the present invention.
Figure 4:
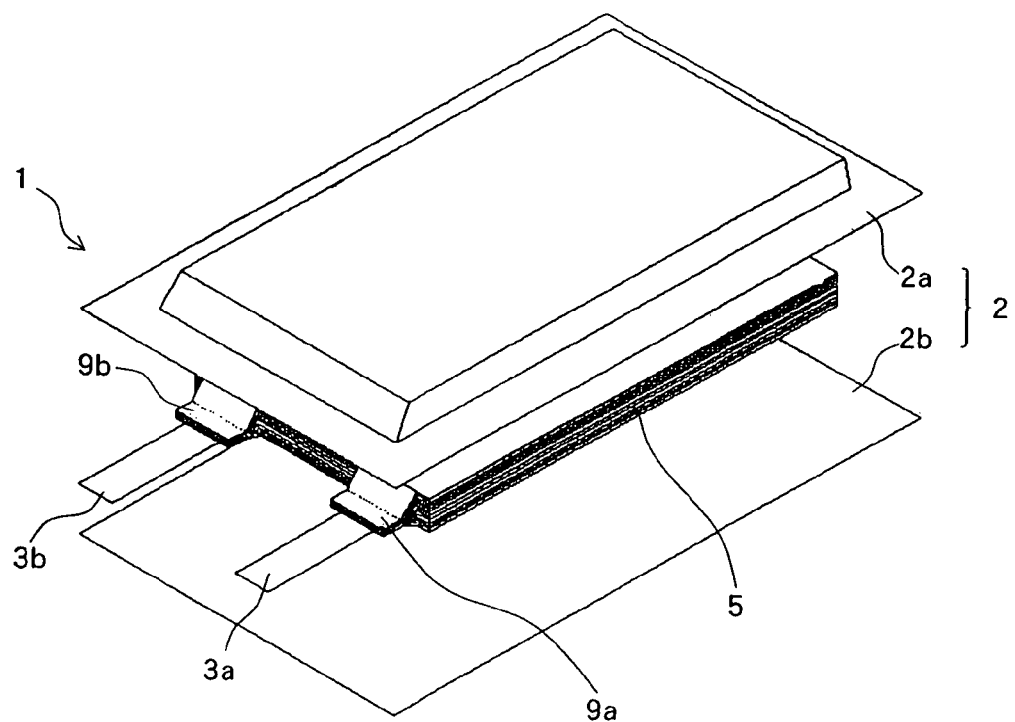
FIG. 4 is an exploded perspective view illustrating the structure of the film covered battery according to the present invention illustrated in FIG. 3.

Referring to FIGS. 3 and 4, film covered battery 1 according to a first embodiment of the present invention illustrated therein comprises battery element 5, positive charge collector 9a and negative charge collector 9b arranged in battery element 5, casing 2 for containing battery element 5 together with an electrolytic solution, positive lead terminal 3a connected to positive charge collector 9a, and negative lead terminal 3b connected to negative charge collector 9b.

Casing 2 is comprised of two casing films 2a, 2b for sandwiching battery element 5 therebetween for enclosing battery element 5. Casing films 2a, 2b are thermally fused along their peripheries to seal battery element 5. In this event, three sides of respective casing films 2a, 2b are previously thermally fused to form a bag-like shape. Air within bag-shaped casing 2 is exhausted from an interspace between remaining open sides of casing 2, and subsequently, the remaining sides of casing films 2a, 2b are thermally fused into close contact with each other to seal battery element 5 within resulting casing 2. Alternatively, the remaining sides may be thermally fused in a vacuum atmosphere into close contact with each other to seal battery element 5 within resulting casing 2.

Out of casing films 2a, 2b, casing film 2b on which battery element 5 is carried is made of a sheet material which is not processed in particular, whereas casing film 2a, which covers battery element 5, is formed with a recess for receiving battery element 5 by a deep drawing process such that casing film 2a is formed into a collared cup shape. For sealing battery element 5, the collar of casing film 2a is thermally fused with casing film 2b.

Known materials generally used for film covered batteries may be used for casing films 2a, 2b, such as a laminate film comprised of a metal foil and a thermally-sealable resin laminated thereon, and the like.

In the first embodiment, casing 2 is comprised of two casing films 2a, 2b. Alternatively, a single casing material may be folded into two for sandwiching battery element 5 therebetween, and three open sides of the casing material may be thermally fused to seal battery element 5. In the latter case, the casing material may be formed with a recess for receiving battery element 5 in a portion of the casing material which covers battery element 5 when it is folded into two.

Battery element 5 will be described with reference to FIG. 5.

Figure 5:
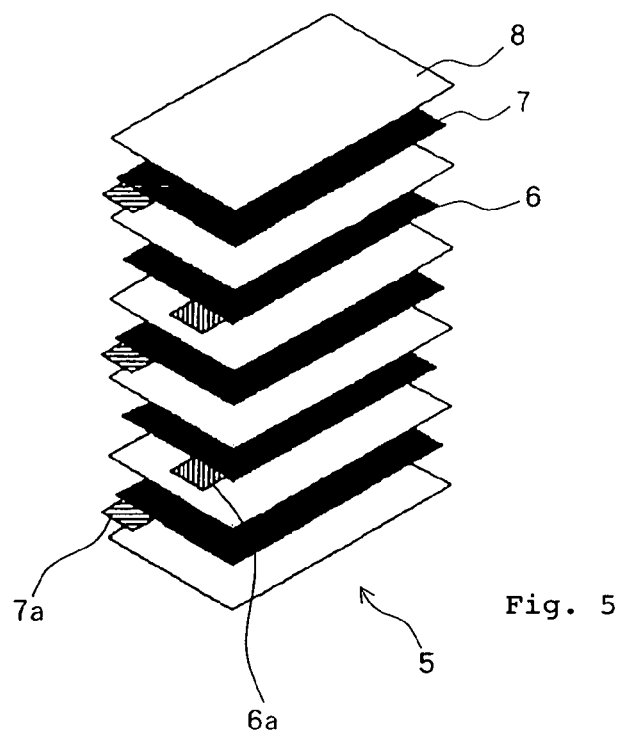
FIG. 5 is an exploded perspective view illustrating the structure of a battery element shown in FIG. 4.

As illustrated in FIG. 5, battery material 5 has a plurality of positive electrodes 6 and a plurality of negative electrodes 7 which are alternately laminated such that negative electrodes 7 are located on the outermost sides. Separators 8 are disposed between each positive electrode 6 and each negative electrode 7, and outside of outermost negative electrodes 7. Each of positive electrodes 6 or negative electrodes 7 is formed with tab 6a or 7a which protrudes from one side thereof. Tabs 6a, 7a are not coated with an electrode material. Tabs 6a of positive electrodes 6 and tabs 7a of negative electrodes 7 are arranged at different positions from each other such that tabs 6a of positive electrodes 6 lay on one another, and tabs 7a of negative electrodes 7 also lay on one another.

These tabs 6a of positive electrodes 6 and tabes 7a of negative electrodes 7 are collectively ultrasonic welded to form positive charge collector 9a and negative charge collector 9b, respectively. Then, positive lead terminal 3a is connected to positive charge collector 9a, and negative lead terminal 3b is connected to negative charge collector 9b.

Figure 6:
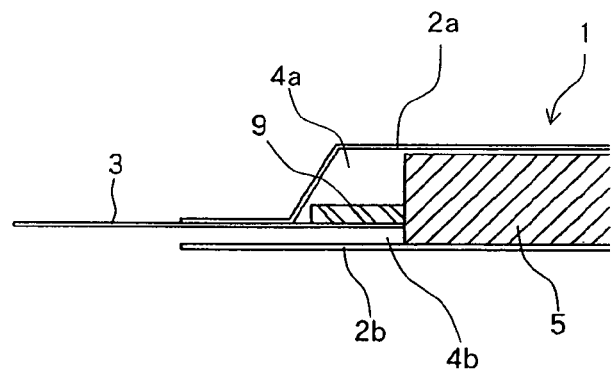
FIG. 6 is a cross-sectional view of the film covered battery illustrated in FIG. 3 near a charge collector before casing films are thermally fused to form a casing.

FIG. 6 illustrates a cross-sectional view of film covered battery 1 near charge collector 9, taken along a direction in which the lead terminal is led out, before casing films 2a, 2b are thermally fused. It should be noted that in FIG. 6, since the components associated with the positive electrode and negative electrode have the same structure, they are simply referred to as lead terminal 3 and charge collector 9, without distinguishing those associated with the positive electrode from those associated with the negative electrode. Also, in FIG. 6, battery element 5 and charge collector 9 are illustrated schematically. The foregoing is also applied to the following description, so that the lead terminal and charge collector are referred to when those associated with the positive electrode are not necessarily distinguished from those associated with the negative electrode, and the cross-sectional views of the battery element and charge collector are illustrated schematically.

As illustrated in FIG. 6, charge collector 9 is formed at a position inside of both surfaces of battery element 5 with respect to the thickness direction thereof, and lead terminal 3 is cantilevered by charge collector 9 and extends outward from casing films 2a, 2b. Charge collector 9 may be formed at such a position, for example, when the aforementioned tabs of the electrodes are ultrasonic welded, by placing the tabs on a base which is convex with respect to a surface on which battery element 5 is carried, and ultrasonic welding the tabs on the base.

Charge collector 9 formed at the position as mentioned above allows space 4a to be formed between charge collector 9 and upper casing film 2a above charge collector 9, and space 4b to be formed between charge collector 9 and lower casing film 2b below charge collector 9, when battery element 5 is sandwiched by casing films 2a, 2b and received by the recess formed in upper casing film 2a.

Figure 7:
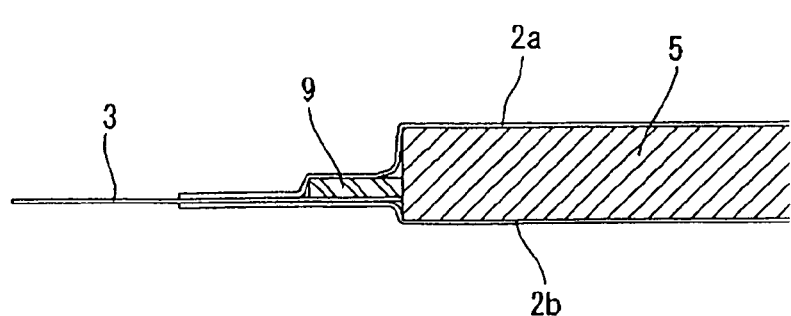
FIG. 7 is a cross-sectional view of the film covered battery illustrated in FIG. 3 near the charge collector after the battery element has been sealed.

As casing films 2a, 2b are thermally fused along their peripheries and the internal space defined by casing films 2a, 2b is evacuated, on charge collector 9 exerted are an upward force toward casing film 2a and a downward force toward casing film 2b due to spaces 4a, 4b defined above and below charge collector 9. As a result, charge collector 9 is prevented from deforming upward, and as illustrated in FIG. 7, when battery element 5 has been sealed, lead terminal 3 can be extended straight from battery element 5.

For more effectively demonstrating the foregoing advantage, space 4b is defined below charge collector 9 before battery element 5 is sealed, as a matter of course, and additional importance should be attached to the balance in volume between space 4b and the volume space 4a formed above charge collector 9. In this respect, when battery element 5 has a thickness of, for example, 3 mm or more, charge collector 9 is preferably positioned 1 mm or more inside of both surfaces of battery element 5 with respect to the thickness direction thereof.

Also, as illustrated in FIG. 6, in the first embodiment, the recess formed in casing film 2a has a depth which is so chosen as to correspond to the height from the top of a portion of positive lead terminal 3a or negative lead terminal 3b extending from casing films 2a, 2b to the top of battery element 5.

The depth thus chosen contributes to the minimized volume of space 4a formed between battery element 5 and casing film 2a, thereby making it possible to prevent unintended deformation due to the bowing of casing film 2a when battery element 5 is sealed. However, the depth of the recess of casing film 2a is not limited to the foregoing, but may be set as appropriate in a range from this depth to a depth equivalent to the thickness of battery element 5.

Second Embodiment

Figure 8:
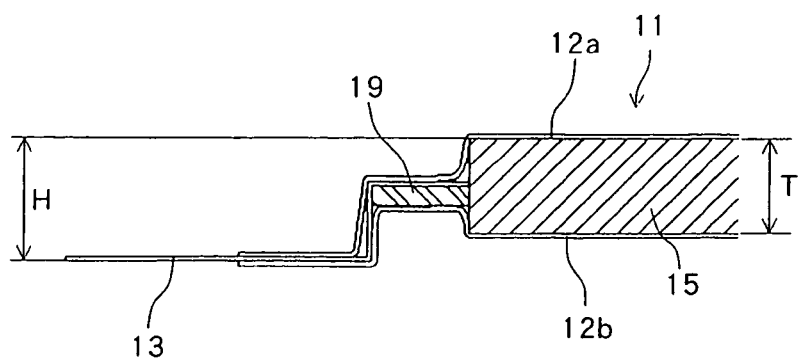
FIG. 8 is a cross-sectional view of a film covered battery according to a second embodiment of the present invention near a charge collector.

Referring to FIG. 8, there is illustrated a film covered battery according to a second embodiment of the present invention near a charge collector in a cross-sectional view.

The second embodiment differs from the first embodiment in that lead terminal 13 is bent in a crank shape toward casing film 12b which is formed without a recess for receiving battery element 15. The use of thus bent lead terminal 13 permits the height of lead terminal 13 extending from casing films 12a, 12b to be substantially at the same height of the bottom of battery element 15. This facilitates the connection of lead terminal 13 when film covered battery 11 is mounted on a device.

However, when lead terminal 13 is bent such that the leading end of bent lead terminal 13 is completely coplanar with the bottom of casing film 12b, the weight of battery element 15 is also supported by the leading end of lead terminal 13, so that when the space between casing films 12a, 12b is evacuated in the event of sealing battery element 15, casing film 12b is drawn up to the bottom of charge collector 19 to cause casing film 12b to lift battery element 15 up. If battery element 15 is lifted up in this manner, lead terminal 13 will extend in an oblique direction as a consequence.

To avoid this inconvenience, bending of lead terminal 13 is set such that height H from the bottom of the leading end of bent lead terminal 13 to the top of battery element 15 is larger than thickness T of battery element 15 to such a degree that a gap is formed between battery element 15 and casing film 12b when battery element 15 connected to lead terminal 13 is carried on casing film 12b. Additionally, in the second embodiment, the depth of the recess formed in casing film 12a is set to a depth substantially equal to the height from the top of a portion of lead terminal 13 extending from casing films 12a, 12b to the top of battery element 15, i.e., the depth which is equal to the aforementioned height H minus the thickness of lead terminal 13.

By thus floating battery element 15 avobe lower casing film 12b, when casing film 12b is attracted to charge collector 19 by evacuating the space defined by casing films 12a, 12b, battery element 15 is lifted up by casing film 12b with a reduced force. As a result, lead terminal 13 can be effectively prevented from bowing when battery element 15 is sealed. For more effectively demonstrating this advantage, the aforementioned height H is preferably set to be larger than thickness T of battery element 15 by 1 mm or more in consideration of slight undulation on lower casing film 12b.

Third Embodiment

Figure 9:
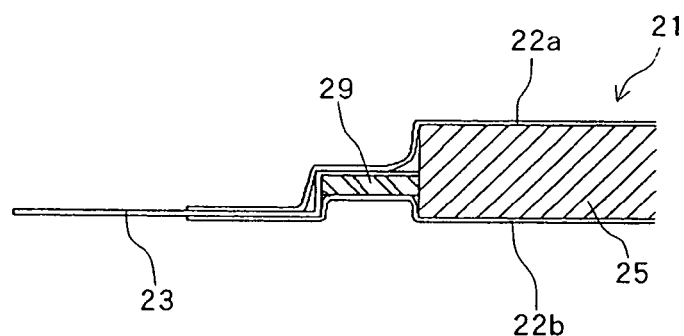
FIG. 9 is a cross-sectional view of a film covered battery according to a third embodiment of the present invention near a charge collector.
Figure 10:
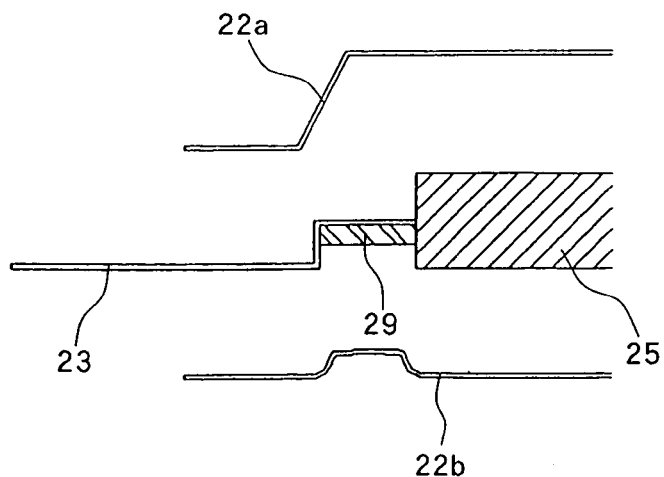
FIG. 10 is a diagram illustrating the film covered battery of FIG. 9 with casing films being separated therefrom.

FIG. 9 illustrates a cross-sectional view of a film covered battery according to a third embodiment of the present invention near a charge collector. FIG. 10 illustrates the film covered battery of FIG. 9 with casing films being separated therefrom.

Film covered battery 21 of the third embodiment is similar to the second embodiment in that lead terminal 23 is bent in a crank shape toward casing film 22b which is not formed with a recess for receiving battery element 25. Additionally, in the third embodiment, not only casing film 22a placed above battery element 25 but also casing film 22b placed below battery element 25 are processed by deep drawing process.

Specifically, lower casing film 22b is formed with a protrusion toward charge collector 29 in a region opposing charge collector 29. The protrusion has a height substantially equal to the height from the bottom of battery element 25 to charge collector 29. By thus providing lower casing film 22b with the protrusion, the bottom of charge collector 29 substantially comes into contact with casing film 22b when battery element 25 having lead terminal 23 connected thereto is carried on casing film 22b. As a result, when the space defined by casing films 22a, 22b is evacuated in the event of sealing battery element 25, lower casing film 22b is substantially free from deformation, so that battery element 25 will not be lifted up either.

Therefore, even if the height of a portion of lead terminal 23 extending from casing films 22a, 22b is set to be substantially the same as the height of the bottom of battery element 25, it is possible to prevent lead terminal 23 from bowing in the event of sealing battery element 25 and to extend lead terminal 23 straight from battery element 25.

Fourth Embodiment

Figure 11:
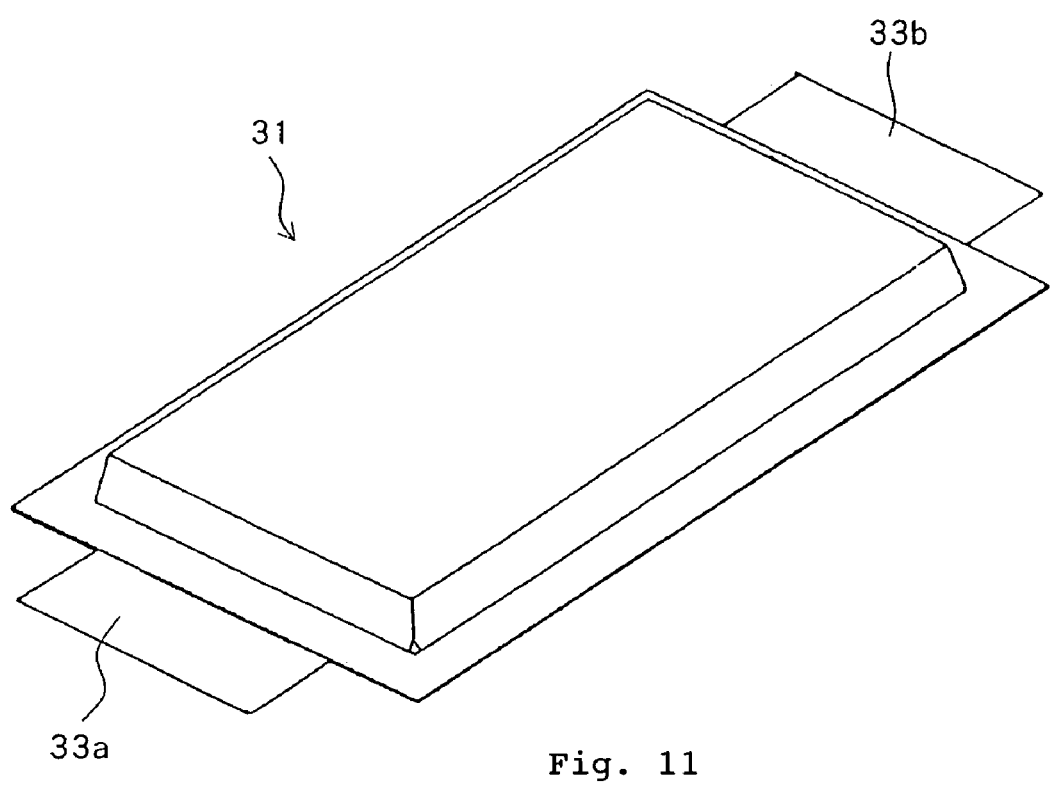
FIG. 11 is a perspective view of a film covered battery according to a fourth embodiment of the present invention.

While the foregoing embodiments have been described in connection with the film cased batteries, each of which has the positive lead terminal and negative lead terminal extending from the same side of the casing, film covered battery 31 according to a fourth embodiment of the present invention illustrated in FIG. 11 has positive lead terminal 33a and negative lead terminal 33b extending from opposite sides of film covered battery 31. Associated with this modification, tabs provided on positive electrodes and negative electrodes of a battery element contained in a casing are also positioned corresponding to positive lead terminal 33a or negative lead terminal 33b. The rest of the structure is similar to that in the first embodiment, so that description thereon is omitted.

By thus extending positive lead terminal 33a and negative lead terminal 33b from the sides different from each other, positive lead terminal 33a and negative lead terminal 33b can be made to have larger widths than those which are extended from the same side. This can reduce the electric resistance of positive lead terminal 33a and negative lead terminal 33b, and accordingly suppress a loss due to positive lead terminal 33a and negative lead terminal 33b.

While the fourth embodiment has shown the film covered battery which has positive lead terminal 33a and negative lead terminal 33b extended from opposite sides, they may be extended out from sides adjacent to each other. Also, in the fourth embodiment, positive lead terminal 33a and negative lead terminal 33b can be bent as in the second embodiment, and a protrusion corresponding to the charge collector can be formed in the casing film which is formed without a the recess for receiving the battery element, as in the third embodiment.

<Fabrication of Positive Electrode>

Lithium manganate powder having a spinel structure, a carbonaceous conductivity addition agent, and polyvinylidene fluoride were mixed and dispersed in N-methylpyrrolidone (in some cases abbreviated as NMP) in a mass ratio of 90:5:5, and agitated for transformation into a slurry. The amount of NMP was adjusted such that the slurry exhibited a proper viscosity. This slurry was uniformly coated on one side of an aluminum foil of 20 μm thick, which would be fabricated into positive electrode 6 using a doctor blade. The coating was performed such that an uncoated portion (portion in which the aluminum foil was exposed) slightly remained in a streaky form. Next, the resulting product was dried in vacuum at 100° C. for two hours. Subsequently, the slurry was coated on the other side of the aluminum foil in a similar manner, and dried in vacuum. In this event, the slurry was coated such that uncoated portions on the front and back sides are aligned with each other.

The aluminum foil coated with the active material on both sides in the foregoing manner was roll pressed. The resulting product was cut into rectangular pieces, including the portion not coated with the active material, for use as positive electrode 6. The portion not coated with the active material was cut away except for part thereof on one side which remained in the rectangular shape, and the rest was used as tab 6b.

<Fabrication of Negative Electrode>

Amorphous carbon powder and polyvinylidene fluoride were mixed and dispersed in NMP in a mass ratio of 91:9, and agitated for transformation into a slurry. The amount of NMP was adjusted such that the slurry exhibited a proper viscosity. This slurry was uniformly coated on one side of a copper foil of 10 μm thick, which would be fabricated into negative electrode 7, using a doctor blade. The coating was performed such that an uncoated portion (portion in which the copper foil was exposed) slightly remained in a streaky form. Next, the resulting product was dried in vacuum at 100° C. for two hours. In this event, the thickness in which the active material was coated was adjusted such that the theoretical capacity of negative electrode 7 per unit area and the theoretical capacity of positive electrode 6 per unit area were each in a ratio of 1:1. Subsequently, the slurry was coated on the other side of the copper foil in a similar manner, and dried in vacuum.

The copper foil coated with the active material on both sides in the foregoing manner was roll pressed. The resulting product was cut into rectangular pieces, the size of which was each larger than the size of positive electrode plate 6 by 2 mm vertically and horizontally, including the portion not coated with the active material, for use as negative electrode 7. The portion not coated with the active material was cut away except for part thereof on one side which remained in the rectangular shape, and the rest was used as tab 7b.

<Fabrication of Battery Element>

Positive electrodes 6 and negative electrodes 7 fabricated in the manner described above, and separators 8 made of a micro-porous sheet having a three-layer structure comprised of polypropylene layer/polyethylene layer/polypropylene layer were alternately laminated as illustrated in FIG. 5 to fabricate a laminate of 3 mm thick. In this event, negative electrode 7 was placed on the outermost sides, and separator 8 was disposed outside of outermost negative electrodes 7 (specifically, in the order of separator/negative electrode/separator/positive electrode/separator/ . . . /negative electrode/separator).

Next, battery element 5, which was the laminate of positive electrodes 6, separators 8, and negative electrodes 7, was carried on a flat base, tabs 6a of positive electrodes 6 were collectively ultrasonic welded with positive lead terminal 3a made of an aluminum plate of 0.1 mm thick, such that the height from the surface on which the laminate was carried to positive lead terminal 3a was 1 mm, to fabricate positive charge collector 9a. Similarly, tabs 7a of negative electrodes 7 were collectively ultrasonic welded with negative lead terminal 3b made of nickel plate of 0.1 mm thick, such that the height from the surface on which the laminate was carried to negative lead terminal 3b was 1 mm, to fabricate negative charge collector 9b.

<Sealing of Battery Element>

Casing film 2a, which was a aluminum laminate film having a four-layer structure comprised of nylon layer/aluminum layer/acid denatured polypropylene layer/a polypropylene layer, was formed with a recess of a size sufficiently larger than battery element 5 through a deep drawing process, such that casing film 2a caves in from the polypropylene layer.

Two casing films 2a, 2b were superposed with battery element 5 placed therebetween, to receive battery element 5 in the recess of one casing film 2a such that positive lead terminal 3a and negative lead terminal 3b alone extend from casing films 2a, 2b, as illustrated in FIGS. 4 and 6. Then, casing films 2a, 2b were joined by thermal fusion along three sides.

Next, from an interspace between the remaining sides which had not been joined, an electrolytic solution was poured into the space defined by casing films 2a, 2b which contained battery element 5.

The electrolytic solution used herein was made of 1 mol/liter of $LiPF_6$ as a supporting salt, and a mixed solvent of propylene carbonate and ethylene carbonate (in a mass ratio of 50:50). After pouring the electrolytic solution, the space defined by casing films 2a, 2b was evacuated, and remaining sides were thermally fused to seal battery element 5, thus fabricating film covered battery 1 which was a lithium secondary battery having casing 2 made of a laminate film.

In resulting film covered battery 1, positive lead terminal 3a or negative lead terminal 3b did not bow in their extending portions from casing 2.

While the present invention has been described with reference to several representative embodiments and specific examples, it should be apparent that the present invention is not limited to them and can be modified as appropriate without departing from the technical idea of the present invention.

For example, while a laminate film comprised of a metal foil and a thermally-sealable resin is used for the flexible casing, any other material can be used instead as long as it accomplishes the function of sealing the battery element.

Also, while the examples given in the foregoing embodiments have shown a laminate battery element which has alternately laminated positive electrodes and negative electrodes, the present invention can also be applied to a wound type. In this case, a positive electrode and a negative electrode may be respectively provided with one or a plurality of tabs for connection with respective lead terminals. When one tab is provided, the tab may be disposed in an intermediate portion in the longitudinal direction of the strip-shaped positive electrode or negative electrode to connect the lead terminal at a position between both surfaces in the thickness direction of the battery element. On the other hand, when a plurality of tabs are provided, the tabs should be disposed at positions such that the tabs provided on the positive electrode, and the tabs provided on the negative electrode lie upon one another, respectively, when the wound positive electrode and negative electrode are compressed into a flat shape. Then, the tabs of the positive electrode and the tabs of the negative electrode are collectively joined, respectively, to form a positive and a negative charge collector.

Also, while the foregoing embodiments have been described in connection with a battery element of a lithium secondary battery given as an example, the present invention can also be applied to battery elements for use with other types of chemical batteries such as a nickel hydrogen battery, a nickel cadmium battery, a lithium methyl primary battery or secondary battery, a lithium polymer battery, as well as to a capacitor element and the like.

Although certain preferred embodiments of the present invention have been shown and described in detail, it should be understood that various changes and modifications may be made without departing from the spirit or scope of the appended claims.

What is claimed is:

1. A film covered battery comprising:
a laminate battery element having a first side and a second side in a thickness direction thereof, said battery element having a plurality of positive electrodes and a plurality of negative electrodes which are alternately laminated, and each of the positive electrodes and the negative electrodes comprising a tab protruding therefrom;
a flexible casing comprised of two halves for sandwiching said battery element from said first side and said second side of said battery element to seal said battery element, said casing including a recess in one of said halves for receiving said battery element on said first side of said battery element;
positive and negative charge collectors formed, respectively, by collectively joining the tabs of said positive electrodes in the thickness direction and collectively joining the tabs of said negative electrodes in the thickness direction, said charge collectors being substantially planar and parallel to said sides of said battery element; and
lead terminals connected respectively to said positive charge collector and said negative charge collector, said lead terminals being substantially planar or having a crank shape, and the connected surfaces of said lead terminals connected respectively to said positive and negative charge collectors being horizontal and being positioned between and parallel to said first side and said second side of said battery element.

2. The film covered battery according to claim 1, wherein said battery element has a thickness of 3 mm or more, and each of said charge collectors is positioned 1 mm or more inside of said first surface and said second surface of said battery element.

3. The film covered battery according to claim 1, wherein the recess formed in said casing has a depth which is substantially equal to the height from the surface of a portion of said lead terminal extending from said casing to the first surface of said battery element.

4. The film covered battery according to claim 1, wherein each said lead terminal is bent in a crank shape in a direction opposite to said half of said casing formed with said recess.

5. The film covered battery according to claim 4, wherein a leading end of each said bent lead terminal is positioned beyond the second surface of said battery element.

6. The film covered battery according to claim 5, wherein the distance from the surface of the leading end of each said bent lead terminal opposite to said recess to the second surface of said battery element is 1 mm or more.

7. The film covered battery according to claim 1, wherein:
each said lead terminal is bent in a crank shape in a direction opposite to said half of said casing formed with said recess, and
said casing includes a protrusion formed on the other half thereof in a region opposing said charge collector, said other half being located opposite to said one half formed with said recess across said battery element, said protrusion being substantially equal to the height from the second surface of said battery element to said charge collector.

8. The film covered battery according to claim 1, wherein said positive lead terminal and said negative lead terminal are connected to said battery element on sides of said battery element different from each other.

9. The film covered battery according to claim 1, wherein said battery element is a chemical battery element or a capacitor element.

* * * * *